Nov. 19, 1963 R. E. DIENER ETAL 3,111,044
MACHINE WITH INDEXING MECHANISM
Filed Dec. 29, 1960 4 Sheets-Sheet 1

INVENTORS
ROBERT E. DIENER
BY NICHOLAS P. DARASH
ATTORNEYS

Nov. 19, 1963　　　R. E. DIENER ETAL　　　3,111,044
MACHINE WITH INDEXING MECHANISM

Filed Dec. 29, 1960　　　　　　　　　　　　4 Sheets-Sheet 2

INVENTORS
ROBERT E. DIENER
BY NICHOLAS P. DARASH
Hudson, Boughton,
Williams, David & Hoffmann
ATTORNEYS Nov. 19, 1963 R. E. DIENER ETAL 3,111,044
MACHINE WITH INDEXING MECHANISM
Filed Dec. 29, 1960 4 Sheets-Sheet 3

INVENTORS
ROBERT E. DIENER
NICHOLAS P. DARASH
BY
ATTORNEYS

INVENTORS
ROBERT E. DIENER
NICHOLAS P. DARASH
BY Hudson, Boughton,
Williams, David & Hoffman
ATTORNEYS United States Patent Office 3,111,044
Patented Nov. 19, 1963

3,111,044
MACHINE WITH INDEXING MECHANISM
Robert E. Diener, Shaker Heights, and Nicholas P. Darash, Euclid, Ohio, assignors to The Warner & Swasey Company, Cleveland, Ohio, a corporation of Ohio
Filed Dec. 29, 1960, Ser. No. 79,291
12 Claims. (Cl. 74—826)

The present invention relates to a machine having indexing mechanism for indexing a member thereof and, particularly, to a lathe having mechanism for indexing a turret as the support therefor is moved to and from a withdrawn or retracted position.

An important object of the present invention is to provide a new and improved machine tool in which a turret is released for indexing upon being raised, from a seated position in which it is locked, by the operation of relatively rotatable cooperating nut and screw elements, one of which is rotatably supported on the turret, the relative rotation of the nut and screw elements preferably being accomplished in response to the movement of an actuating member which also effects the indexing of the turret after it is raised and the return of the turret to its seated position after the indexing has been accomplished.

Another object is to provide a new and improved machine in which a slide member carries a rod, which is free to move endwise in one direction from an initial position and to return, and is coupled and decoupled to a stationary abutment to effect reciprocation of the rod as the slide member is reciprocated relative to the abutment with the coupling construction being such that the rod is not subject to axial forces during coupling and is positively returned to its initial position prior to decoupling.

Still another object of the present invention is to provide a new and improved machine having an indexing mechanism in which the index wheel and pawl which is reciprocable to effect the indexing of the wheel are constructed and operated in such a manner that the wheel cannot overrun the pawl at the end of the indexing stroke of the pawl.

Further objects and advantages of the present invention will be apparent from the following detailed description of the preferred embodiment thereof made with reference to the accompanying drawings forming a part of the present specification and in which.

Figures 6, 7:
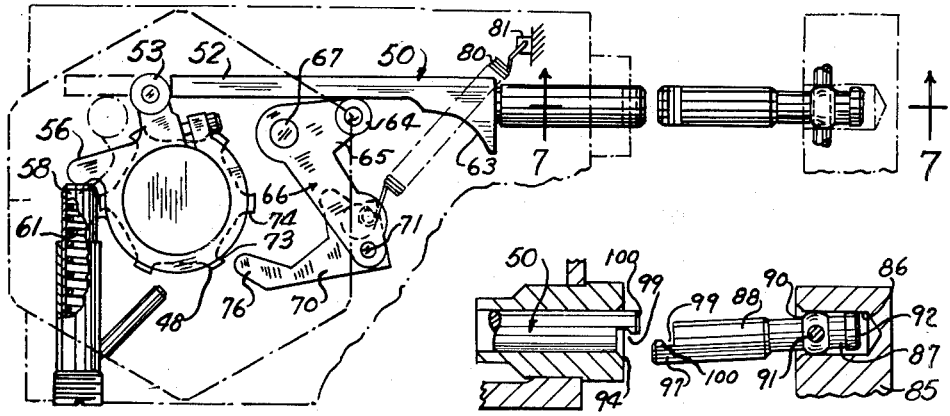
FIG. 6 is a top plan view, somewhat diagrammatic, showing the indexing mechanism for indexing the turret of the machine in FIG. 1 in a position immediately prior to the indexing operation.
Figures 8, 9:
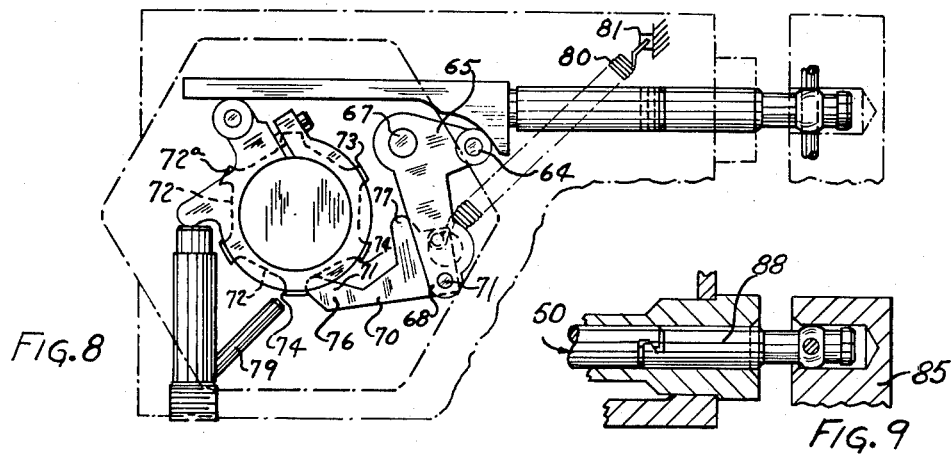
Figures 10, 11:
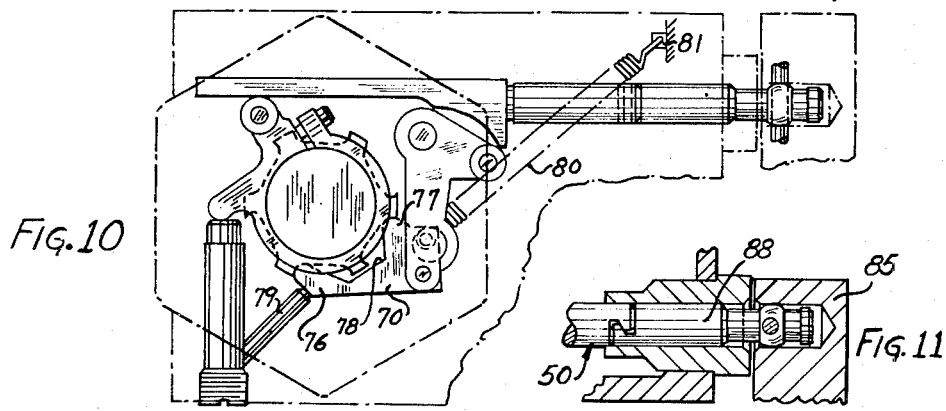

FIG. 7 is a fragmentary sectional view of a portion of FIG. 6 taken in a vertical plane approximately along line 7—7 of FIG. 6; and FIGS. 8–11 are figures corresponding to FIGS. 6 and 7 but showing the operating parts of the turret indexing mechanism in different positions with the parts of FIGS. 8 and 9 illustrating the position of the parts immediately after the turret has been released for indexing and just prior to the indexing operation and FIGS. 10 and 11 showing the condition of the parts upon the completion of the indexing movement of the turret and prior to the locking of the turret.

The present invention is susceptible of various modifications and of uses in various types of machines but is particularly useful when embodied in a lathe for effecting the indexing of a turret during its movement to and from a withdrawn position.

In accordance with one feature of the present invention, the turret to be indexed is seated upon a support member and, when the turret is to be indexed, it is raised from the support member to effect the release of locking means which prevents indexing movement of the turret when in its seated position, the raising of the turret being accomplished by the relative rotation of nut and screw elements, one of which is mounted on the support member and the other of which is carried by the turret, with both of the elements being constrained against axial movement with respect to the support therefor, but with one of the elements being rotatable relative to its support to effect relative axial movement of the screw element and the raising of the turret.

In accordance with another feature of the present invention, the nut and screw elements are relatively rotated in response to the reciprocation of a rod which effects the relative rotation of the elements during the first portion of its movement in one direction and effects the indexing movement of the turret during the latter portion of the movement of the rod in its said first direction and upon reciprocation in the opposite direction, effects the relative rotation of the nut and screw elements to lower the turret to its seated position.

In accordance with still another feature of the present invention, the indexing movements of the turret is effected by a pawl which is reciprocated to engage an index wheel fixed to the turret and which has a leading finger that engages the trailing side of an abutment on the wheel to effect the advancing of the index wheel and which has a trailing finger that engages the leading side of an abutment on the wheel at the termination of the indexing movement to form a stop which prevents the index wheel from overrunning the pawl.

Figure 1:
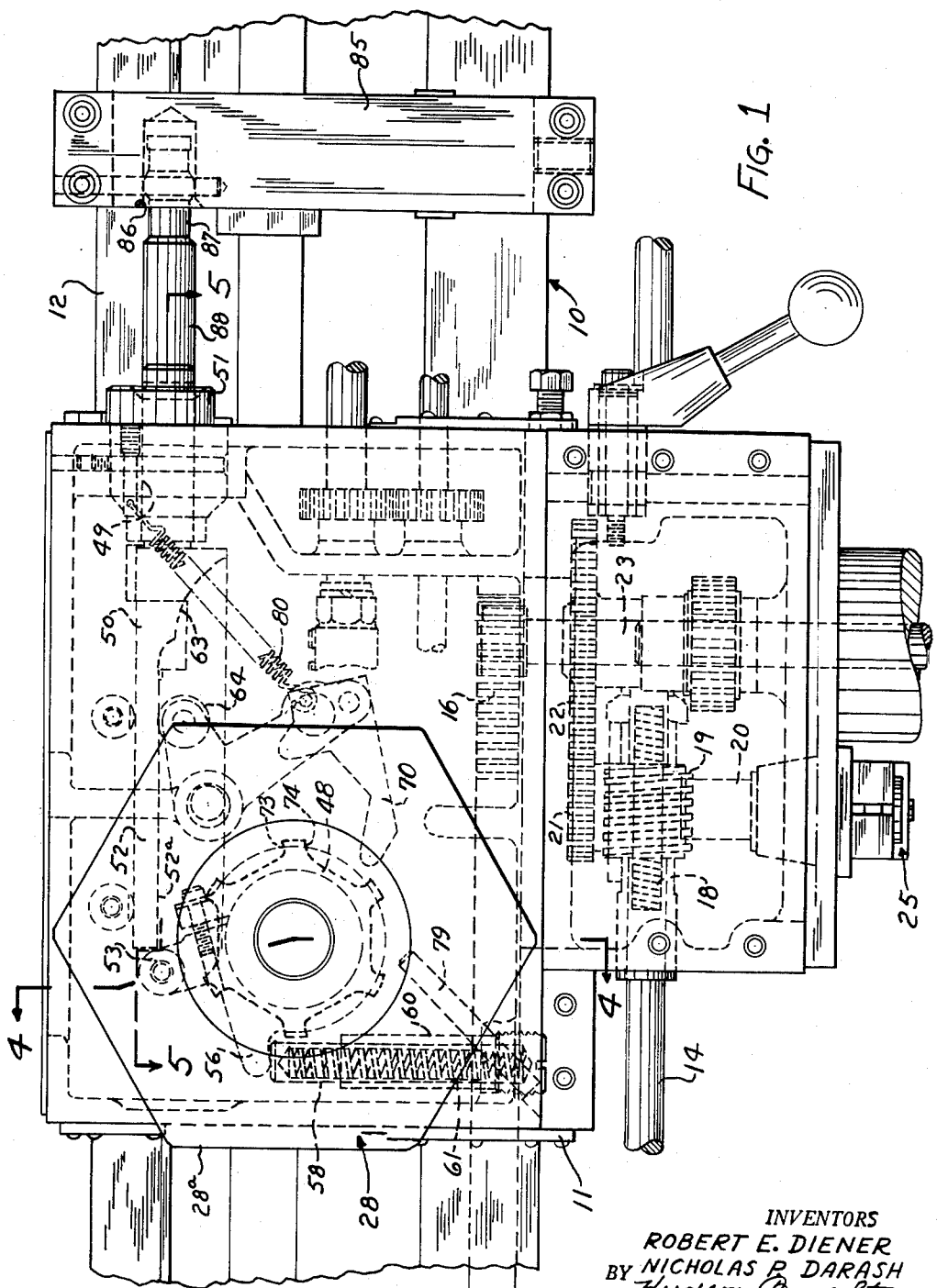
FIG. 1 is a fragmentary top plan view of a machine, i.e. a lathe, embodying the present invention.
Figure 2:
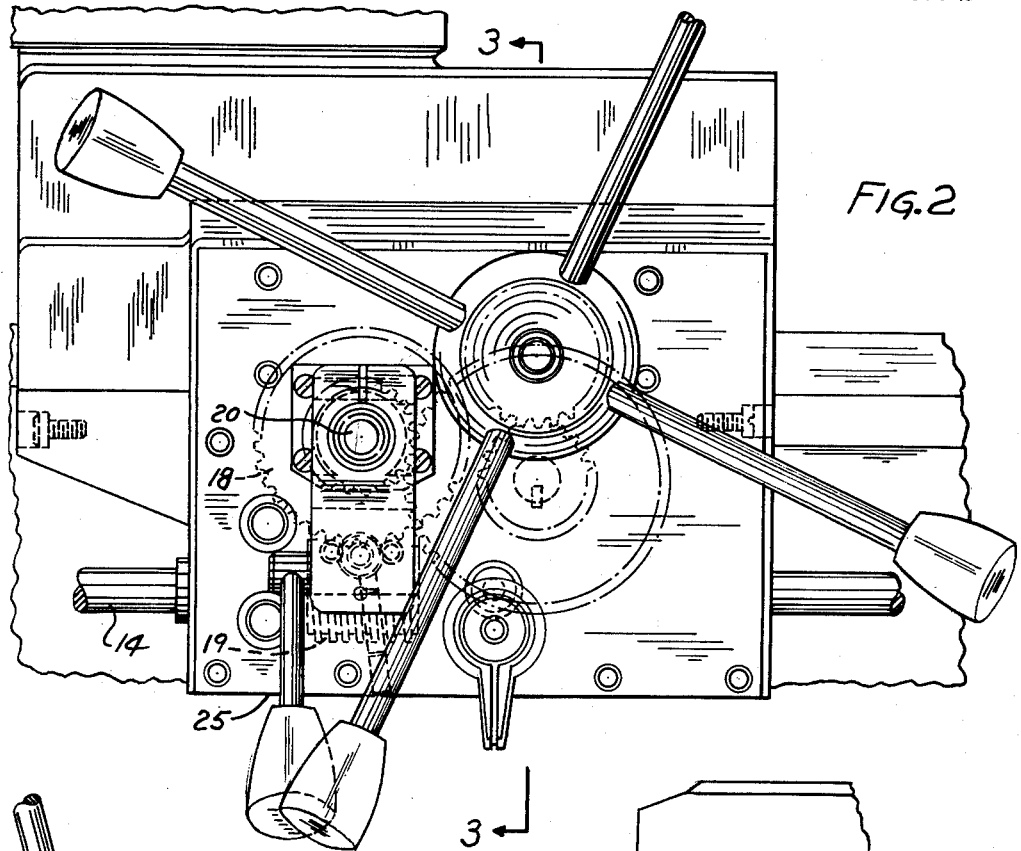
FIG. 2 is a front elevational view of the portion of the machine shown in FIG. 1.
Figure 3:
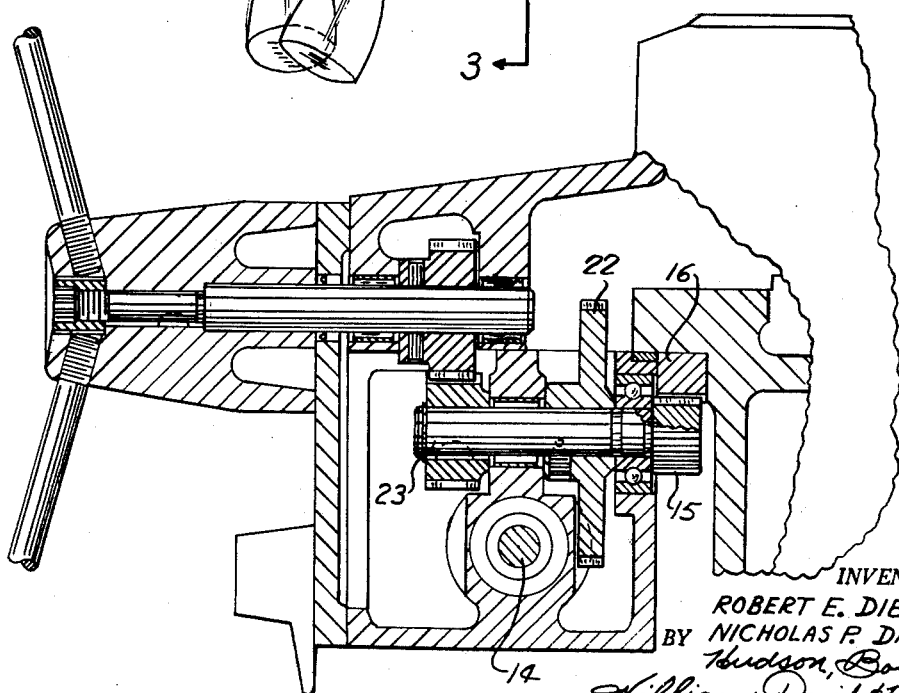
FIG. 3 is a sectional view taken approximately along line 3—3 of FIG. 2 with parts thereof shown in elevation.

Referring to the drawings, a portion of a lathe bed 10 is shown in FIG. 1 of the drawings. A saddle 11 is slidably supported on ways 12 formed on the lathe bed 10 and extending parallel to the axis of the work spindle of the lathe, the work spindle not being shown in the drawings but normally being disposed at the left-hand end of the ways 12 in the conventional lathe. The saddle 11 is adapted to be reciprocated along the ways 12 to move the saddle toward and from the workpiece by a drive from a feed shaft 14 extending parallel to the ways 12 along the front of the lathe bed 10. The feed shaft 14 is the conventional feed shaft normally associated with lathes and is rotated in timed relation to the rotation of the work spindle (not shown). The saddle 11 carries a pinion 15 which meshes with a rack 16 fixed to the front of the lathe bed 10 and the pinion 15 is adapted to be driven from the feed shaft 14 to effect movement of the saddle 11 along the ways 12. The drive from the feed shaft 14 to the pinion 15 may be a conventional drive and does not form a part of the present invention. Suffice it to say that, in the illustrated drive, the saddle 11 rotatably supports a worm wheel 18 which meshes with a worm 19 slidably keyed to the feed shaft 14 and constrained against axial movement with respect to the saddle 11. The worm wheel 18 is fixed to a shaft 20 rotatably mounted in the saddle 11 and having a gear 21 fixed thereto which meshes with a gear 22 fixed to a shaft 23 to rotate the latter upon rotation of the gear 21. The pinion 15 is also fixed to the shaft 23 and is driven upon rotation of the shaft 23 to move the saddle 11 along the lathe bed 10. The shaft 20 may include suitable clutching mechanism for selectively connecting and disconnecting the worm wheel 18 in driving relationship with the shaft 20 and this clutching mechanism might be controlled by a lever 25 mounted on the front of the saddle 11. Suitable means may also be provided for reversing the direction of drive. While it is not believed that a description of the drive from the feed shaft 14 to the pinion 15 is necessary for an understanding of the present invention, it only being necessary to understand that the saddle 11 is reciprocable on the ways of the lathe bed 10, reference is made to application Serial No. 17,153, filed March 23, 1960, by Robert E. Diener and Nicholas P. Darash and disclosing and claiming a drive mechanism suitable for use in driving the pinion 15 from the feed shaft 14.

The saddle 11 carries a turret 28, and in the lathe, the turret is adapted to mount a plurality of tools which are to be successively indexed to a working position, i.e. the position of the face 28a in the illustrated embodiment, whereat the tools are to be used to perform on a workpiece in the machine. As is shown in the drawings, the turret comprises a hexagon-shaped tool-holding member 30 having a ring 31 fixed to the underside thereof and which seats on a ring 32 fixed to the upper side of the saddle 11. The rings 31, 32 have a plurality of mating teeth 33 on their adjacent surfaces which form a curvic coupling that holds the turret against rotation when the teeth are meshed. To index the turret, it is necessary to raise the turret so that the teeth on the rings 31, 32 clear each other.

The turret 28 also includes a shaft 36 which depends from the tool-holding member 30 and extends along the axis of rotation of the turret. The shaft 36 is received in an opening 37 in the bottom of the tool-holding member 30 and is keyed thereto so that the tool-holding member 30 and the shaft 36 rotate as a unit. Furthermore, the shaft 36 has a shoulder adjacent the underside of the tool-holding member 30 which abuts the underside of the tool-holding member to constrain the shaft against movement in one direction and a nut 39 on its inner end which engages the tool-holding member 30 and constrains the shaft against movement axially outwardly of the tool-holding member 30.

Figure 4:
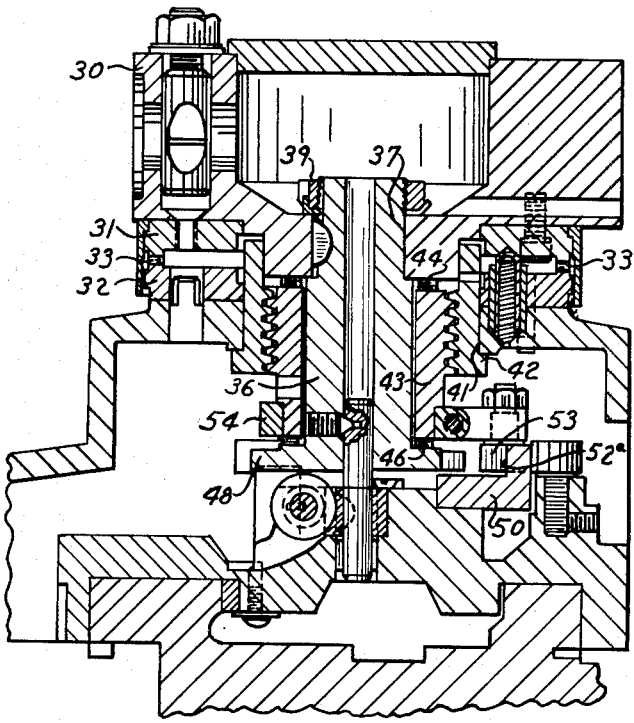
FIG. 4 is a sectional viey taken approximately along line 4—4 of FIG. 1.
Figure 5:
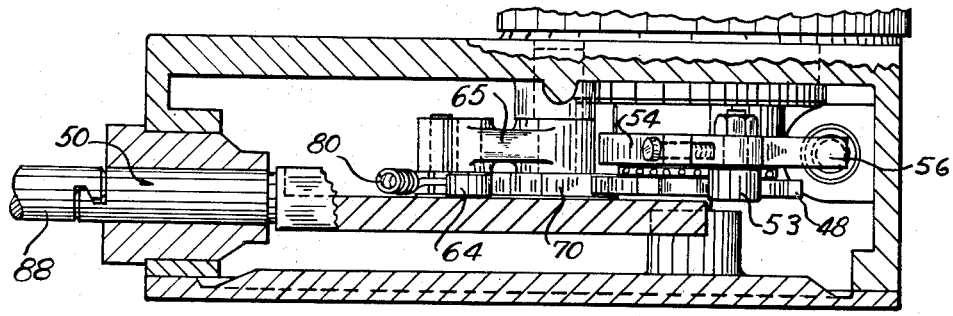
FIG. 5 is a fragmentary sectional view taken approximately along line 5—5 of FIG. 1.

The shaft 36 extends downwardly from the tool-holding member 30 through an opening 41 in the top of the saddle 11, which opening is coaxial with the ring 32. A nut element 42 is disposed about the shaft 36 and is fixed in the opening 41 and cooperates with a screw element 43 rotatably supported on the shaft 36. The screw element 43 is in the form of a bushing or collar which is rotatably mounted on the shaft 36 and which is held against upward movement, as viewed in FIG. 4, relative to the shaft by a thrust bearing 44 disposed between the upper end of the screw element 43 and the underside of the tool-holding member 30 and is held against downward movement relative to the shaft 36, as the latter is viewed in FIG. 4, by a thrust bearing 46 disposed between the lower end of the screw element 43 and an index wheel 48 formed on the lower end of the shaft 36 and providing a radially outwardly extending abutment which is engaged by the thrust bearing 46. It can be seen that by rotating the screw element 43 in the proper direction, the screw element 43 will move axially upwardly relative to the nut element 42 and the turret will be carried therewith in an upward direction to raise the turret to clear the teeth 33 on the ring 31 from the mating teeth on the ring 32 to release the turret 28 for indexing movement. When the turret is elevated, the turret will be supported on the end of the screw element 43, which is, in turn, carried by the nut element 42.

The screw element 43 is rotated to raise the turret 28 by an actuating rod 50 extending parallel to the ways 12 and slidably supported in the saddle 11. As is best shown in FIG. 1, the actuating rod 50 is slidably supported in a bore 49 in a boss 51 formed as part of the saddle casing at the right-hand end of the saddle and extends from the boss inwardly of the saddle and to one side of the shaft 36. The actuating rod 50 has an inner end portion 52 which is adapted to engage a roller 53 fixed to a collar 54 secured to the lead screw element 43 as the actuating rod 50 is moved inwardly from its position shown in FIG. 1. The roller 53 is disposed immediately adjacent the end of the end portion 52 when the rod is in the position shown in FIG. 1 and as the actuating rod 50 is moved inwardly, the collar 54 and, in turn, the lead screw element 43 is rotated until the roller 53 is displaced sufficiently to ride on the side 52a of the rod 52, the side 52a being straight over the extent thereof which is engaged by the roller 53 upon reciprocation of the rod. The collar 54 is fixed to the lead screw element 43 adjacent its lower end and has an ear 56 which extends outwardly therefrom and engages a plunger 58 that extends inwardly from the front of the saddle 11. The plunger 58 is slidably received in a casing 60 extending inwardly from the front of the saddle 11 and the plunger is urged outwardly of the casing by a spring 61 disposed within the plunger 58 and abutting the bottom of the casing 60. Rotation of the collar 54 by the actuating rod 50 causes the ear 56 to depress the plunger 58 and load the spring 61. The spring 61 in the plunger 58 will act to return the collar 54 and, in turn, the lead screw element 43 after the latter have been displaced by the actuating rod 50 when the actuating rod 50 is returned to the position shown in FIG. 1.

It can be seen that when the actuating rod 50 is moved to the left from the position shown in FIG. 1, the end portion 52 rotates the collar 54 to rotate the lead screw element 43 and raise the turret 28 sufficiently to disengage the cooperating teeth 33 on the curvic coupling rings 31, 32. When the actuating rod 50 is returned to the position shown in FIG. 1, the spring 61 operates to return the collar 54 to rotate the lead screw element 43 to again lower the turret 28 to engage the teeth 33 on the curvic coupling rings 31, 32.

The actuating rod 50 also has a cam surface 63 thereon which is adapted to engage a cam follower 64 and effect the indexing of the turret 28. The cam surface 63 engages the cam follower 64 after the actuating rod 50 has rotated the collar 54 to raise the turret and continued movement of the rod will cause the cam surface 63 to effect the indexing of the turret. The cam follower 64 is rotatably mounted on an arm 65 of a lever 66 rockably supported by a pin 67 for rocking movement about an axis parallel to the axis of the shaft 36. The pin 67 is disposed rearwardly and to the right side of the shaft 36, as the shaft is viewed in FIG. 1, and the arm 65 extends from the pin 67 in a direction generally away from the index wheel 48. The lever 66 also includes an arm 68 which has a pawl 70 pivotally secured to the outer end thereof. The pawl 70 is adapted to engage the index wheel 48 and effect an indexing of the wheel 48 upon reciprocation of the lever 66 toward and from the wheel. It will be noted that the arm 68 extends forwardly from the pin 67 and that the pin 67 is in one quadrant of the wheel, while a pivot connection 71 for the pawl 70 is in a different but adjacent quadrant. The pawl 70 extends from the arm 68 toward the index wheel and the lever 66 is rocked to move the arm 68 toward and away from the wheel and, when the arm 68 is moved toward the index wheel, the pawl 70 engages the wheel and effects movement thereof through a predetermined angular amount.

The index wheel 48 has a plurality of notches or openings 72 in the periphery thereof. The notches 72 actually provide a series of projections or abutments 72a which extend outwardly from the periphery of the wheel, with the projections being spaced an angular distance from each other corresponding to the angular amount which the wheel is to be indexed. The projections each have a trailing face 73 which is concave and a leading face 74 which is inclined slightly in the direction of rotation from the outer edge of the projection to the periphery of the index wheel.

The pawl 70 has a leading finger 76 which is adapted to fit against the trailing sides 73 of the projections and a trailing finger 77 which is adapted to engage the lead sides of the projections on the wheel. When the pawl is positioned with the leading finger 76 against the trailing edge of one of the projections, the finger 77 is adapted to engage the leading side of a following projection. The pawl 70 is shown positioned in this manner in FIG. 10 of the drawing, and it will be seen that the pawl 70 has a recess or cutout portion 78 intermediate the fingers to accommodate a projection intermediate the projections engaged by the fingers 76, 77. The position shown in FIG. 10 is that position which the pawl occupies at the end of its indexing movement and it will be readily apparent from FIG. 10 that the indexing wheel 48 cannot rotate relative to the pawl when positioned as in FIG. 10.

Prior to the indexing movement, the pawl 70 and the lever 66 are positioned as shown in FIG. 6 where the arm 68 of the lever 66 extends from its pivot 67 in a direction away from the adjacent side of the indexing wheel and the pawl 70 extends from the outer end of the arm 68 toward the indexing wheel 48. As the lever 66 is rocked in a clockwise direction about its pivot, the leading finger 76 of the pawl 70 is moved into engagement with the trailing side of one of the abutments and will cause rotation of the index wheel 48 and, in turn, the turret 28 as the rocking of lever 66 toward the index wheel is continued. As the indexing movement proceeds, the pawl 70 moves angularly about its pivot with respect to the lever 68 and the portion of the pawl 70 which carries the trailing finger 77 is moved toward the index wheel 48 and as the lever 66 completes the indexing stroke, the trailing finger 77 is moved into engagement with the leading edge of one of the projections on the indexing wheel to prevent overtravel of the indexing wheel. In the illustrated embodiment, the finger 77 engages the leading edge of the second abutment or projection following the one engaged by the leading finger 76. At the end of the indexing stroke, the leading finger 76 engages an abutment or pin 79 and the parts of the indexing mechanism have the positions as shown in FIG. 10. After the indexing movement is completed, the lever 66 is rocked counterclockwise about its pivot, as viewed in FIGS. 6, 8 and 10, to return to the position shown in FIG. 6. This counterclockwise movement will withdraw the pawl 70 and it will be noted that the initial movement of the pawl is away from the wheel in a direction which permits the fingers 76, 77 to clear the abutments and this withdrawal is facilitated by the slope on the lead side of the projection engaged by the trailing finger 77. During the retraction of the pawl 70, it is rotated to the position of FIG. 6 by a spring 80 tied between the pawl 70 and an anchor 81 fixed to the saddle casting. The spring 80 also provides a bias urging the lever 66 in a counterclockwise direction about its pivot, as viewed in FIG. 6, the maintain the cam follower 64 in engagement with the cam surface 63.

The cam surface 63 is shaped to provide the necessary clockwise movement of the lever 66 as the actuating rod 50 is moved inwardly and the spring 80 provides the return movement of the lever 66 and the angular movement of the pawl 70 necessary to reposition the parts, as shown in FIG. 6, when the actuating rod 50 is returned to the position of FIG. 6.

In the illustrated embodiment, the actuating rod 50 is reciprocated by the movement of the saddle 11 toward and away from a stationary abutment provided by a bridge member 85 supported on the ways 12 to the right of the saddle 11, as the saddle is viewed in FIG. 1. The bridge member 85 has a bored recess or opening 86 therein which receives a reduced end portion 87 of a connecting rod 88 and the connecting rod 88 extends outwardly from the bridge member 85 toward the saddle 11. The connecting rod 88 is in substantial alignment with the actuating rod 50 and is coupled to the actuating rod 50 by movement of the saddle 11 toward the bridge member 85. After coupling, the rod 88 effects the actuating movement of the rod 50 as movement of the saddle toward the bridge member 85 is continued.

The connecting rod 88 is supported in the opening 86 for limited rocking movement about a horizontal axis. As is shown in FIG. 7, the reduced end portion 87 of the connecting rod 88 has an annular projection 90 thereon which has an outside diameter approximately the same as the inside diameter of the opening 86 and the surface of the projection 90 is curved to provide a rocking surface for the connecting rod 88. The connecting rod 88 is supported for rocking movement by a horizontal pin 91 which is supported in the side walls of the opening 90. The reduced end portion 87 includes a portion which extends inwardly from the annular projection 90 and which has a shoulder or flange 92 thereon that controls the extent of rocking movement of the connecting rod 88 about the pin 91, the difference between the outside diameter of the shoulder 92 and the inside diameter of the opening 86 determining the maximum rocking movement of the rod.

When the connecting rod 88 is decoupled from the actuating rod 50, the connecting rod 88 is inclined downwardly with respect to the horizontal, as is shown in FIG. 7. When the turret 28 is moved to a position where the connecting rod 88 is to be coupled to the actuating rod 50, the outer end of the connecting rod 88 will engage a cam surface 94 provided by a chamfer at the outer end of the bore in which the actuating rod 50 is slidably supported and which chamfer operates to lift the connecting rod 88 into alignment with the actuating rod 50.

The connecting rod 88 and the actuating rod 50 are provided with interfitting parts 96, 97 which engage each other when the connecting rod 88 is moved upwardly by the cam surface 94. The interfitting parts 96, 97 are provided by cutting away the lower half of the end of the actuating rod 50 and the upper half of the end of the connecting rod 88 to provide a transverse end wall and a projection having a recess 99 and a lip 100 at each of the adjacent ends of the rods with the recess 99 of each part being disposed inwardly of the outer end of the projection and being adapted to receive the lip 100 on the mating part as the connecting rod 88 is moved vertically by the cam surface 94. It will be seen that the described connection can be coupled and decoupled by moving the outer end of the connecting rod 88 upwardly into engagement with the actuating rod 50 to position the lip 100 thereon in the receiving recess 99 on the end of the actuating rod and is decoupled by merely dropping the end of the connecting rod 88.

When the actuating rod 50 and the connecting rod 88 are coupled together by moving the saddle 11 toward the bridge member 85 to cause the cam surface 94 to lift the connecting rod 88 to connect the latter to the actuating rod 50, the continued movement of the saddle 11 toward the bridge member 85 will cause the connecting rod 88 to push the actuating rod 50 and will cause the rod 88 to be received in the bore 49 supporting the actuating rod. It is to be understood that the movement of the saddle 11 is terminated at a withdrawn position when the actuating rod 50 has moved relative to the saddle 11 sufficiently to effect the raising and indexing of the turret. This termination of the movement of the saddle may be accomplished by any suitable drive knock-off mechanism and the feed knock-off mechanism described and claimed in the aforesaid application may be embodied in the machine. When the saddle 11 is next moved away from the bridge member 85, the interfitting parts on the adjacent ends of the actuating rod 50 and the connecting rod 88 will hold the actuating rod against movement with the saddle 11 to effect relative movement between the saddle 11 and the actuating rod 50 until the saddle has moved sufficiently to bring the outer end of the connecting rod 88 outwardly of the bore supporting the actuating rod 50. When this is done, the rod 88 will drop due to gravity, decoupling the rod 88 from the actuating rod 50 and the rod 50 will then move with the saddle 11. The movement of the actuating rod 50 to the right with respect to the saddle 11, as viewed in FIG. 1, will effect the rotation of the lead screw element 43 to seat the turret on the saddle 11 and engage the curvic coupling rings 31, 32.

While the connecting rod 80 is, in the illustrated embodiment, biased downwardly about its pivot 91 by gravity so that it is in a position which enables the mating part on the end of the actuating rod 50 to clear the mating part on the connecting rod 88 as the latter are moved toward each other to be coupled, and to effect the decoupling as the saddle 11 moves away from the bridge member 85, it will be understood that the bias could be provided by suitable spring means and in this case the actuating rod could move other than downwardly, e.g. sideways or upwardly, with respect to the actuating rod 50 to effect the coupling and decoupling.

It can now be seen that the present invention provides a new and improved machine having a mechanism for effecting the indexing of a turret therein, particularly as the member supporting the turret is reciprocated to and from an initial position and, further, provides a machine which accomplishes the foregoing enumerated objects and others. While the preferred embodiment of the present invention has been described in considerable detail, it is hereby our intention to cover all modifications, constructions, and arrangements which fall within the ability of those skilled in the art and within the scope and spirit of the present invention.

What we claim is:

1. In a machine, a support member, an indexible turret mounted on said support member for rotation with respect thereto about an axis and for movement away from a seated position on the member and return, said turret having a shaft extending along said axis and rotatable to rotate said indexible turret and shiftable axially to move said indexible turret from its seated position and return, a pair of cooperating nut and lead screw elements disposed coaxially with said shaft and relatively rotatable to effect axial movement of said indexible member, first means mounting said screw element on said shaft and constraining the element against axial movement relative to said shaft whereby said shaft is a support for the screw element, second means mounting said nut element on said support member and constraining the nut element against axial movement relative to the support member whereby said support member is a support for the nut element, one of said first and second means mounting the element supported thereby for rotation with respect to the support therefor and the other of said first and second means holding the respective element against rotation relative to its support, locking means having cooperating parts on said support member and indexible turret respectively and engaged when said turret is in its seated position and released when moved from its seated position, an indexing wheel carried by said shaft, said wheel having a plurality of abutments on the periphery thereof, a pawl engageable with an abutment on said wheel and movable through an index stroke to rotate the wheel a predetermined angular amount and through a return stroke to reposition the pawl to engage a succeeding abutment, spring means acting on said pawl and urging the latter in a return direction, a cam follower operatively connected to said pawl to advance the pawl through its index stroke upon movement of said follower from a first position to a second position, a reciprocable rod movable from an initial position to a displaced position and return and having a cam thereon effective after a predetermined movement from the initial position to actuate said cam follower from its said first position to its said second position upon continued movement of said rod to its said displaced position, said spring means acting to return said follower on the return of said rod to its said initial position, a part fixed to the rotatable one of said nut and lead screw elements and disposed to be engaged and rotated by said rod during its said predetermined movement, the rotation of said part effected by said rod effecting relative axial movement of said elements in a direction to move said turret from said seated position to release said locking means, and spring means acting on the element rotated by said rod to oppose rotation by said rod and returning the rotated element upon return of said rod to its said initial position to thereby move said indexible member to its seated position and engage said locking means.

2. In a machine, the structure as defined in claim 1 wherein said pawl has two spaced fingers engageable with different abutments on said wheel, said fingers being spaced from each other to provide a leading finger and a trailing finger and said leading finger engaging the trailing side of an abutment on said wheel to index the latter and said trailing finger engaging the lead side of an abutment on said wheel at the end of the indexing stroke to prevent in cooperation with said leading finger relative rotation between said pawl and wheel.

3. In a machine, a support member, an indexible turret mounted on said support member for indexing movement about an axis and for axial movement away from said support member, said turret having a seated position on said support member, locking means for preventing rotation of said indexible member when in its said seated position and disengaged by axial movement of said indexible member away from said support member, said indexible member having a shaft fixed thereto which is rotatable to index the turret, an index wheel on said shaft, a movable pawl adjacent said wheel and engageable therewith to index said turret when moved through an index stroke, a screw element rotatably supported on said shaft and constrained against axial movement relative thereto, a nut element cooperating with said screw element and supported by said support member coaxially with and about said screw element, and means for actuating said pawl and screw element in sequence to first rotate said screw element to move said turret axially and then actuate said pawl through its index stroke to index said turret and then to rotate said screw element in the opposite direction to seat said turret, said means for actuating said pawl and screw element comprising a reciprocable rod having an initial position and a displaced position and reciprocable between the two positions, means on said screw element engaged by said rod and actuated to rotate said screw element during the initial movement of said rod from its initial position to its displaced position, means operatively connected to said pawl and engaged by said rod to actuate the pawl through its index stroke during the latter portion of the movement of said rod from its initial position to its displaced position.

4. In a machine, the structure as defined in claim 3 wherein said wheel has a plurality of angularly spaced abutments on the periphery thereof and said pawl has two spaced fingers engageable with different abutments on said wheel, said fingers being spaced from each other to provide a leading finger and a trailing finger and said leading finger engaging the trailing side of an abutment on said wheel to index the latter and said trailing finger engaging the lead side of an abutment on said wheel at the end of the indexing stroke to prevent in cooperation with said leading finger relative rotation between said pawl and wheel.

5. In a machine, a support member, an indexible turret mounted on said support member for indexing movement about an axis and for axial movement away from said support member, said turret having a seated position on said support member, locking means for preventing rotation of said indexible turret when in its said seated position and disengaged by axial movement of said indexible turret away from said support member to a raised position, said indexible turret having a shaft fixed thereto which is rotatable to index the turret, an index wheel fixed on said shaft, a movable pawl adjacent said wheel and engageable therewith to index said turret when moved through an index stroke, a screw element independent of the index wheel rotatably supported on said shaft and constrained against axial movement relative thereto, a nut element supported by said support member coaxially with and about said screw element, and means for actuating said pawl and screw element in sequence to first rotate said screw element to raise said turret and then actuate said pawl through its index stroke to index said turret and then to rotate said screw element in the opposite direction to seat said turret.

6. In a machine, the structure as defined in claim 5 wherein said wheel has a plurality of angularly spaced abutments on the periphery thereof and said pawl has two spaced fingers engageable with different abutments on said wheel, said fingers being spaced from each other to provide a leading finger and a trailing finger and said leading finger engaging the trailing side of an abutment on said wheel to index the latter and said trailing finger engaging the lead side of an abutment on said wheel at the end of the indexing stroke to prevent in cooperation with said leading finger relative rotation between said pawl and wheel.

7. In a machine having a movable support member, an axially movable rod carried by said support member, which rod is to be actuated in one direction relative to said support from an inactive position as said support member is moved in one direction from a predetermined position approached by movement of said support member in said one direction and returned to the inactive position upon movement of said support member in the opposite direction to said predetermined position, an abutment displaced from said support member in said one direction and engageable by the end of said rod when said support member is moved in said one direction to said predetermined position, said abutment comprising a connecting rod extending in the same general direction as said actuating rod and having a part lapping said actuating rod when said support member is in said predetermined position, means supporting the end of said connecting rod remote from said support member for rocking movement about an axis transversely of the extended axis of said actuating rod and mounting said actuating rod for rocking movement between a position in alignment with said actuating rod to an inclined position wherein the end of the connecting rod facing said actuating rod is offset from the latter enabling said actuating rod to be moved axially to a position lapping the adjacent end portion of said connecting rod, said rods having cooperating parts thereon which are mated by movement of said connecting rod to its aligned position when said rods are overlapped and which when mated transmit axial forces between said rods, and means carried by said support member and engageable with said connecting rod as said support member is moved in said one direction to said predetermined position to move said connecting rod about its axis to mate said parts, and means constraining said rods against separation for positions of said support member displaced from said predetermined position in said one direction.

8. In a machine, the structure as defined in claim 7 wherein said means carried by said support member and engageable with said connecting rod as said support member is moved to said predetermined position comprises a cam surface disposed adjacent said actuating rod and engaged by the adjacent end of said connecting rod.

9. In a machine, the structure as defined in claim 7 wherein said interfitting parts on said rods comprise projections extending outwardly from the ends of said rods to overlie each other and to abut the adjacent end of the other rod, each projection having male and female portions which are interfitted with the part on the other projection by rocking movement of said connecting rod about its axis as said projections move into overlapping relationship with each other and abutting engagement with the ends of said rods.

10. In a machine having a first support member and a second movable support member supported for relative movement toward and away from said first support member and first and second rods supported by respective ones of said members and which are to be connected to form extensions of each other as the support members therefor are relatively moved toward each other, means supporting said first rod on its respective support member to dispose the first rod in general alignment with said second rod but with the end thereof nearer to said second rod being offset from said second rod thereby enabling said rods to move to an overlapped position, the ends of said rods facing each other having interfitting parts including a projection on one rod extending transversely of said rods and adapted to be received in a part on the other rod by relative lateral movement of said rods as said rods are moved to an overlapped position, means on the support member carrying said first rod engageable by said second rod as said support members are relatively moved toward each other to overlap said rods for effecting relative lateral movement of said rods to mate said parts, means on one of said members constraining said rods against relative lateral movement for relative positions of said members displaced toward each other from the position where said parts are mated, said rods being biased laterally from each other to move said parts from interfitting relationship.

11. In a machine, a support member, an indexible turret mounted on said support member for indexing movement about an axis and for axial movement away from siad support member, said turret having a seated position on said support member, locking means for preventing rotation of said turret when in its said seated position and disengaged by axial movement of said turret from said support to a raised position, said turret having shaft means fixed thereto rotatable to index the turret, drive means operatively connected to said shaft to rotate said shaft means to index the turret, cooperating means on said turret and support operable to raise said turret to release said locking means, and a single rod member movable in a generally endwise direction relative to said turret and support to actuate said cooperating means to raise said turret away from the support and then actuate said drive means to rotate said shaft to index said turret.

12. In a machine, a support member, an indexible turret mounted on said support member for indexing movement about an axis and for axial movement away from said support member, said turret having a seated position on said support member, locking means for preventing rotation of said turret when in its said seated position and disengaged by axial movement of said turret from said support to a raised position, said turret having shaft means fixed thereto rotatable to index the turret, mechanical means operable to rotate said shaft to index said turret, an arm member movable from a first position to a second position to operate said mechanical means to index said turret, cooperating mechanical means on said turret and support operable to raise said turret to release said locking means, an actuatable member movable from a first position to a second position to operate said cooperating mechanical means to raise said turret, and a single rod member movable in a generally endwise direction relative to said turret and support and having a first portion engageable with said actuatable member to move said actuatable member to its said second position to operate said cooperating mechanical means to raise said turret and a second portion engageable with said arm member to move said arm member to its said second position to operate said mechanical means for rotating said shaft to index said turret after said first portion engages and moves said actuatable member to its said second position.

References Cited in the file of this patent

UNITED STATES PATENTS

| | | |
|---|---|---|
| 198,761 | Card | Jan. 1, 1878 |
| 475,399 | Holt | May 24, 1892 |
| 559,148 | Shewell | Apr. 28, 1898 |
| 2,366,079 | Wilson | Dec. 26, 1944 |
| 2,371,014 | Zuellig | Mar. 6, 1945 |
| 2,558,953 | Henninger et al. | July 3, 1951 |
| 2,921,487 | Schabot | Jan. 19, 1960 |

FOREIGN PATENTS

| | | |
|---|---|---|
| 1,077,505 | Germany | Mar. 10, 1960 |
| 853,791 | Great Britain | Nov. 9, 1960 |